United States Patent [19]

Amann

[11] Patent Number: 4,803,787
[45] Date of Patent: Feb. 14, 1989

[54] METHOD AND DEVICE FOR PREVENTING CONDENSATION ON COOLED TOOLS OF PLASTIC WORKING MACHINE

[75] Inventor: Emmo Amann, Hohenems, Austria

[73] Assignee: Gottfried Amann & Sohn Ges.m.b.H. & Co., Hohenems, Austria

[21] Appl. No.: 889,931

[22] PCT Filed: Aug. 7, 1985

[86] PCT No.: PCT/EP85/00403

§ 371 Date: Apr. 2, 1986

§ 102(e) Date: Apr. 2, 1986

[87] PCT Pub. No.: WO86/01144

PCT Pub. Date: Feb. 27, 1986

[30] Foreign Application Priority Data

Aug. 7, 1984 [AT] Austria ............... 2561/84
Aug. 7, 1984 [AT] Austria ............... 2582/84

[51] Int. Cl.[4] ............................. F26B 21/08
[52] U.S. Cl. ............................. 34/50; 34/54; 34/80; 34/202
[58] Field of Search .............. 34/50, 54, 80, 202

[56] References Cited

U.S. PATENT DOCUMENTS

| | | | |
|---|---|---|---|
| 2,249,624 | 7/1941 | Bichowsky | 34/80 |
| 2,438,120 | 3/1948 | Freygang | 62/6 |
| 2,680,355 | 6/1954 | Colomb | 62/140 |
| 3,012,411 | 12/1961 | Kjellman | 62/173 |
| 3,304,623 | 2/1967 | Reiss et al. | 34/80 |
| 4,022,560 | 5/1977 | Heinonen | 34/80 |
| 4,482,007 | 11/1984 | Yoshimi et al. | 165/21 |

FOREIGN PATENT DOCUMENTS

| | | |
|---|---|---|
| 2600117 | 7/1977 | Fed. Rep. of Germany . |
| 5569432 | 8/1980 | Japan . |
| 1349732 | 4/1974 | United Kingdom . |

OTHER PUBLICATIONS

Plastics Engineering, vol. 31, No. 5, May 1975, L. B. Ryder, Faster Cooling for Blow Molding, pp. 18-25.
Plastverarbeitner, vol. 29, No. 2, Echte Hilfen Fur Den Praktiker, pp. 86-87, Feb. 1978.
Modern Plastics International, Don Scibor, "How Mold Dehumidficatoy can increase Productivity", pp. 145-146, Sept. 1983.

Primary Examiner—Henry A. Bennett
Attorney, Agent, or Firm—Herzig & Yanny

[57] ABSTRACT

The procedure to prevent the formation of condensation on tools that are heated in use and are cooled by a circulated coolant is particularly relevant to plastic moulding machines. To avoid the build-up of condensation from dampness on the cooled tools a dry air veil, as herein laid down, is produced by direct blowing-on of the tools, through which the cooling water temperature of the circulated coolant in the tools can be further reduced making shorter work cycles possible. By use of a special control equipment, the dew point on the tool surface is picked up which regulates the cooling water temperature accordingly.

5 Claims, 3 Drawing Sheets

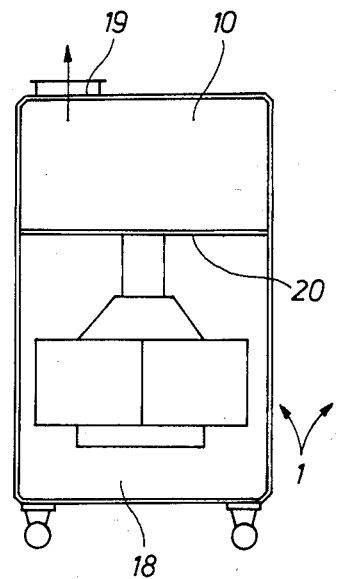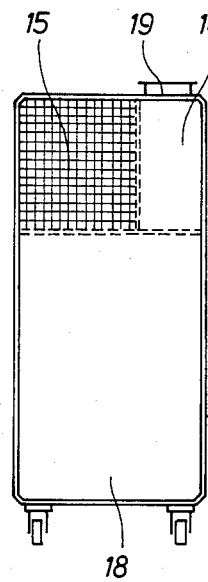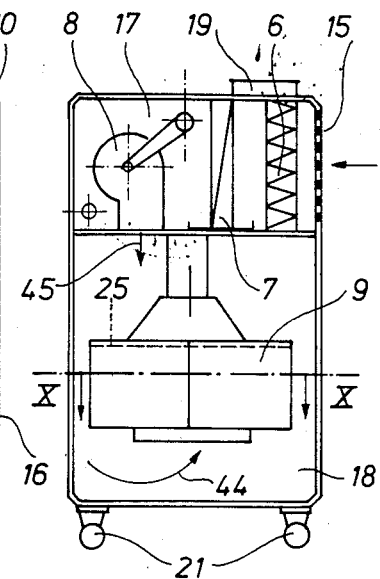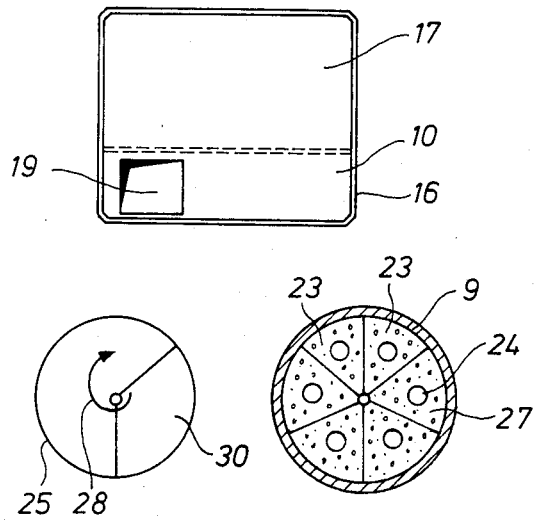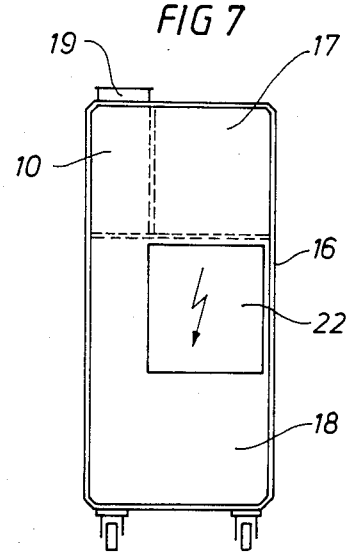

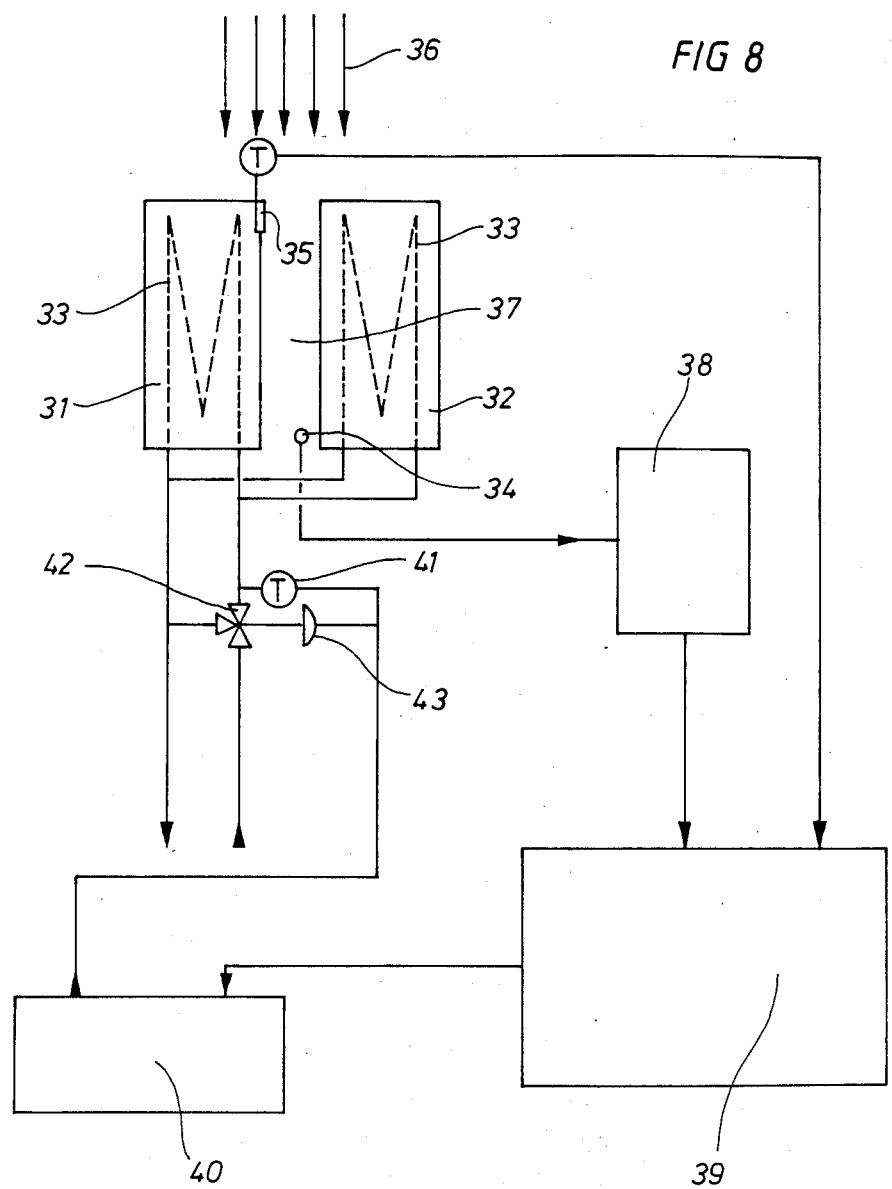

METHOD AND DEVICE FOR PREVENTING CONDENSATION ON COOLED TOOLS OF PLASTIC WORKING MACHINE

BACKGROUND OF THE INVENTION

The invention concerns a procedure to prevent the formation of moisture on tools which are heated during operation and are cooled by a circulating coolant, particularly plastic moulding machinery, together with equipment to generate a flow of dry air for use of tools which are heated during operation and are cooled by a circulating coolant, particularly those tools associated with plastic moulding machinery, for the carrying out of the procedure.

In the case of plastic spraying tools, a continuous cooling to induce a rapid setting of the plastic compound is provided generally by use of a coolant which flows through the tools. This cooling effect is usually produced by use of cold water-cooled spraying tools.

The total working cycle of a machine tool with cooled tools which are heated during operation is calculated from the total of single operations and their required time. A fundamental factor of the total working cycle is the so-called "cooling time", during which time the operationally heated tools must be cooled down. Especially for plastic spraying tools a continuous cooling to induce rapid setting of the plastic compound is generally provided by a coolant flowing through the tool. The tool temperature should be held as low as possible to achieve a short cooling time and thereby a shorter working cycle. However, the coolant should not reach too low a temperature in order to avoid the build-up of condensation on the surface of the tools. The result of water separation from condensation is the creation of a high scrap rate among items in the tools or items produced by the tools.

BRIEF SUMMARY OF THE INVENTION

The invention under consideration has the aim of creating a procedure and equipment of the type described in the foregoing to avoid the problems as described, whereby an optimal prevention of the appearance of condensation in the case of such tools can be achieved.

In accordance with the procedure according to the invention it will be proposed that a veil of dry air is created in the area of the tools by means of a current of air directed on the tools, whereby suitable dry air ducting of the same shape and size as the tools is introduced to achieve an even distribution of dry air in suitable angular positions.

In a further development of the invention it will be proposed that measuring instruments for temperature and relative humidity be introduced into the environmental area of the tools to determine the dew point temperature of the air surrounding the tools and further temperature measuring instruments on the tool surface are provided whereby, dependent on the comparable values of both instruments, datum values for the cooling water pre-cool temperature and as required, other datum values for the operation of machine tools are controlable.

Through this procedure, according to the invention, an optimal influence on the tools of a dry air current will be achieved, as a dry air current or dry air veil is available directly onto every area where the danger of the development of condensation exists. Due to the direct blowing action a corresponding changing of the air in the region of the tools is guaranteed, which is not the case in the layout arrangement of an air conditioned space around the tools. By the application of this procedure, according to the invention, the appearance of condensation in water cooled or other coolant-influenced spray tools is, for all practical purposes, ruled out. The scrap rate can be reduced to a minimum, in that at least the dampness inclusions and the smudgy surfaces originating from condensation on the tool surface can be avoided. Through the direct blowing on of the tools by a dry air veil, the coolant can be operated at a lower temperature thus producing substantially shorter working cycles of the tool-carrying machines. This leads to higher production rates and, incidentaly, also to a higher quality.

Through these measures, according to the invention, it is ensured that the surface temperature of the tools is always held minimally above the dew point of the environmental air in the area of the tools. It is by means of the adjusting of the pre-cool temperature of the coolant that the shortest possible cooling time of the tools is always possible. In this way it is also possible to optimally adjust the rate of operation of the machine tools and therefore the rate of operation of the corresponding tools independent of the season or daily variations. For all ambient temperatures of the tools and at any relative humidity, which can both be reduced particularly by the blowing of dry air on the tools, a correct setting of the pre-cooling temperature of the coolant is available thus enabling the best possible usage of the machine tool. Different methods of dry air veil generation are possible, all of which are covered by this invention.

Generally the cooling of the air to below the dew point temperature is provided. The cooling effect is created by either a water-cooled heat exchanger or a refrigeration unit (compressor or absorber principle). The evaporator is designed here as a heat exchanger, through which flows the air to be dried and is cooled to below the dew point temperature.

A further preferred embodiment example provides that the moisture to be extracted is trapped in fluid absorbents such as Lithium Chloride, Calcium Chloride or Triethylene Glycol.

In connection with this invention, however, the trapping of the moisture by a solid dessicant by absorption (Silica Gel or a molecular sieve) is recommended.

A particularly effective drying action is achieved if the air to be dried flows first through a pre-cooler or pre-drier and then through a drier containing a solid dessicant.

In this manner the optimum possibility of achieving a dry air flow is created particularly by the grouping of the pre-cooler/pre-drier where the air drawn in undergoes the first drying process followed by the second de-humidifier, acting on the absorption principle, which makes an effective removal of the remaining moisture possible. Such a measure is particularly advantageous because the tools with a correspondingly high rated flow should be blown on, so a rapid and effective drying of air is necessary. This can only be achieved by equipment built in accordance with the invention where, through the cooling down of the drawn-in damp air a large condensation rate is induced leading to an optimal pre-drying whereby the absorption stage can remove the remaining moisture.

The concept of this invention also includes the principle that the air is circulated, i.e. that the air flowing around the moulds will be collected in the area of the moulds and drawn in for further redrying by the equipment according to the invention.

In another arrangement of the device it is possible to operate the pre-cooler with a refrigerant instead of cooling water, or also to connect two pre-coolers in series, the first operating with refrigerant and the second with cooling water. The absorber desiccant drier would then be connected to follow both pre-coolers.

The use of a solid desiccant assumes that the solid desiccant would be regenerated at regular intervals to maintain the drying efficiency.

The regeneration of the absorber desiccant is achieved by a heating of the desiccant, which can be carried out by means of an electrical heating element or by a steam-heated coil. The absorbed mixture is thus given off and led to exhaust outside.

In the following the invention will be further explained by means of drawings illustrating several embodiment methods. Here, further features and advantages essential to the invention arise from the drawings and their descriptions.

BRIEF DESCRIPTION OF THE SEVERAL VIEWS OF THE DRAWINGS

FIG. 3: The equipment in accordance with the invention seen from the front with the cover removed.

FIG. 4: A side view of the equipment.

FIG. 5: A view of the equipment from the rear, also with cover removed.

FIG. 6: A plan view of the equipment.

FIG. 7: A view of the opposite side to FIG. 4.

FIG. 8: A schematic illustration of two tools of a machine tool where the complete control layout is only shown in the form of schematic information on the control elements.

FIG. 10: Schematic section (detail X—X in FIG. 5) of a drier.

FIG. 11: Plan view of sector shutter (25) in drier (9).

DETAILED DESCRIPTION

Figure 1:
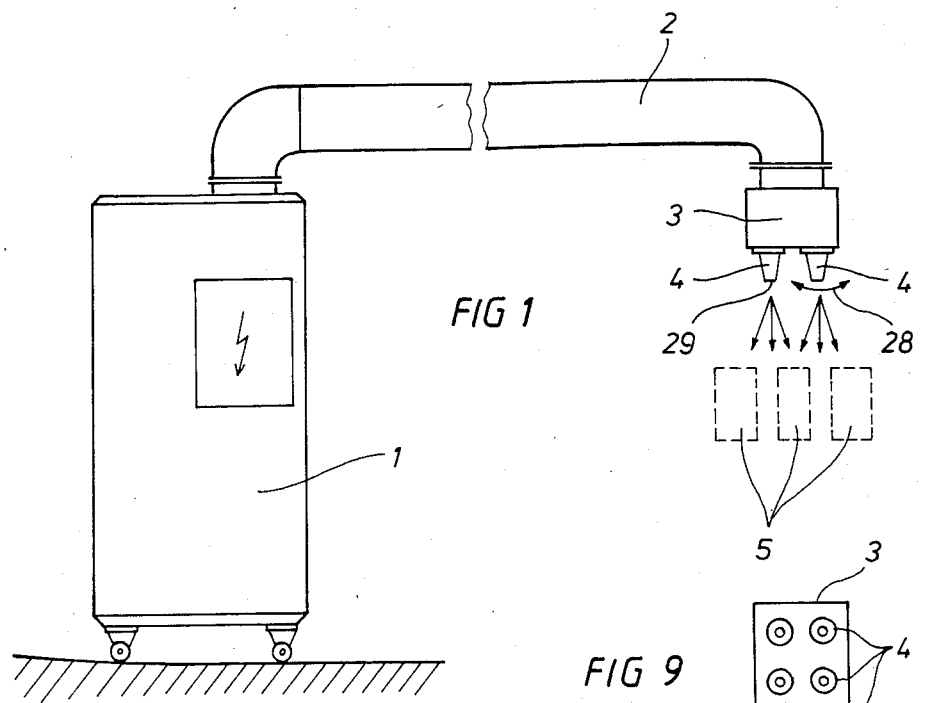
FIG. 1: Equipment, in accordance with the invention, for the creation of a dry air veil, in which the tools are shown in schematic form.

FIG. 1 is a schematic assembly to explain the procedure and equipment according to the invention. In the equipment (1) a flow of dry air is produced which is led through a dry air duct (2) to a blower box (3) and then through wide-throw jets (nozzles 4) to the tools (5) shown by the dotted lines. The tools (5) become heated during use. The tool temperature should be kept as low as possible to achieve short cooling times and thus short working cycles. It is particularly important in the case of plastic moulding machines that, before each new work cycle, the lowest possible temperature is again achieved by specific cooling down. Through this cooling down phase, without the use of dry air, the surface temperature of the tools rapidly exceeds the dew point temerature which leads to the formation of condensation on the surfaces. Therefore the pre-cool temperature of the coolant must be set correspondingly higher to avoid this effect. More time is then required to conduct the heat from the tools and plastic compound which means correspondingly longer work cycles.

Specifically to prevent such condensation, a dry air veil is produced in the area of the tools (5) by a direct blowing-on of the tools (5) in accordance with the procedure according to the invention. Nozzles (4) of the same shape and size as the tools are used to achieve an even distribution of dry air in suitable angular positions. The nozzles can be adapted to the design of the tools and, for example, be constructed in the form of wide-throw jets and slots etc.

Figure 9:
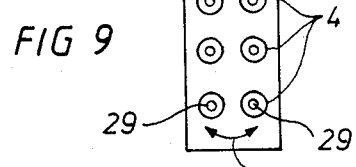
FIG. 9: Plan view from above of the blower box and nozzles.

In the illustrated embodiment example the nozzles (4) are shown as jets (29) which can be swivelled in arrow direction (28) (compare with FIG. 9), to achieve optimal air distribution over the moulds of the tools (5).

A build-up of condensation is avoided right at the start by means of the flow of dry air, so that a rapid cooling down of the tools (5) through a lower temperature of the coolant is possible, thereby dramatically raising the capacity of the machines.

A specific control of the inter-dependent factors is also possible in that the dew point temerature is measured in the area of the tools (5). Using this temperature measurement, the remaining moisture, as required the adjustment of the nozzles (4), the temperature of the coolant for the tools (5) and also the rate of operation of the tools (5)-carrying machine can be controlled. This makes possible an optimal setting of all the factors necessary for the operation of such plastic moulding machines so that a much higher parts production rate is achieved at a higher quality.

Figure 2:
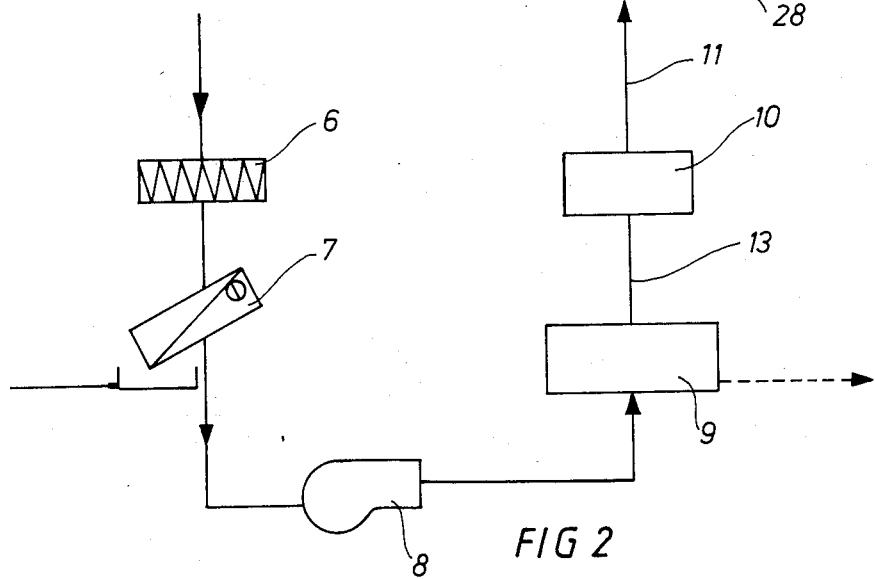
FIG. 2: A schematic block diagram of the equipment to produce a flow of dry air.

The principal of operation of the equipment to produce the flow of dry air in accordance with the invention can be determined from FIG. 2. Damp air is drawn in through a filter (6) and passes to a pre-cooler/pre-drier (7) and is then conveyed by fan (8) to the second absorber-principle drier (9) then through a mixing chamber (10) to the dry air ducting (11). The pre-cooler/pre-drier (7) is cooled by coolant, e.g. cooling water, in which, because of the drastic cooling of the drawn-in air to a temperature of approx 10° C. a large condensation build-up occurs and thus in addition to the cooling of the air, an optimal pre-drying effect is created.

Especially well planned is the positioning of the fan (8) between driers (7) and (9) in that, at this stage, the fan (8) only passes on already pre-dried air.

The layout of the individual elements in the equipment is illustrated in FIGS. 3 to 7. The air is drawn in through a grille (15) in the sidewall of the housing (16) whereby the following filter (6), pre-cooler/pre-drier (7) and the fan (8) are all fitted in a horizontal channel (17). Air is drawn in by the fan (8) and passed in arrow direction (45) down to a pressure-sealed chamber (18), which lies beneath channel (17), in which chamber (18) the absorber principle drier (9) is fitted. On the underside of this drier (9), the air is led in, in the direction of arrow (44), and after passing through the drier (9), reaches the mixing chamber (10) mounted above chamber (18) and adjacent to the channel (17). A connection stub (19) is provided on mixing chamber (10) to which can be connected the dry air duct (2) shown in FIG. 1. With this arrangement the optimal air drying process takes place in the minimum of space required in which the channel (17) forms, so to speak, the pre-drying station, the residual drying takes place in chamber (18) in the drier (9) and the desired humidity is arrived at in mixing chamber (10). The complete equipment (1)

can be made mobile by mounting on wheels (21) enabling easy manoeuvrability to suit differing situations.

Naturally differing designs of pre-cooler (7) can be incorporated in which the most efficient condensing of the air by pre-cooling can be effected. The cooling process can be achieved by use of any required coolant but is effectively achieved by the use of cold water circulation.

The construction of the absorber principle drier (9) can likewise be of varying design allowing the most effective desiccant to be used. For example a synthetic material with great water absorption properties can be used in which by optimal air flow and speed in the drier (9) a specific drying of the air can be achieved.

Either an electric or electronic system (22) can be fitted in the housing (16) of the equipment (1) to effect the control of the complete equipment. Obviously, the equipment (1) can be regulated depending on the absolute moisture content of the ambient air, in that the ambient air is drawn into the equipment (1) to be dried.

The tools (31) and (32) are illustrated in FIG. 8, which are moveable in relation to each other and make the two mould halves into an injection moulding machine. The tools (31) and (32) are shown in the open position, therefore they are arranged at a short distance from each other to eject the ready-made injection-moulded article. Channels (33) are provided for in the tools (31) and (32) through which the cooling water flows.

In the surrounding area of the tools (31) and (32), measuring instruments for the measurement of temperature and relative humidity are provided, whereby, from these measurements the dew point temperature of the air surrounding the tools can be determined. On tools (31) and (32) or only on one tool (31) a further temperature measuring device (35) is provided to measure the temperature of the tool surface.

The temperature values of the dew point temperature and the tool surface temperature can be compared in which it is to be observed that the tool (31) and (32) surface temperature is always maintained minimally above the dew point of the ambient air. Condensation of the ambient air on the water cooled tools (31) and (32), is thus avoided in all cases.

The tools (31) and (32) have a dry air flow (36) directed over them thus creating the dry air veil arround the tools (31)(32) which allows the further lowering of the dew point temperature, all the more so as the relative humidity of the ambient air around the tools (31)(32) is dramatically reduced by the dry air flow (36). Therefore an even more rapid cooling of the tools (31)(32) is possible by a lower cooling water temperature without leading to condensation of the ambient air on the cold water cooled tools (31)(32).

Due to the control arrangement according to the invention, setting values dependent on the comparable values of the dew point and tool surface temperatures can be achieved for differing switching arrangements on the injection moulding machine. A setting value can be especially set for the cooling water pre-cool temperature, by which the optimal cooling down time of the tools (31)(32) is always achieved, which independent of the season or daily climatic variations, the optimal cooling down time and therewith optimal operating time of the injection moulding machine is achieved in each case.

When the tools are to be acted upon by a dry air flow, it is practical to mount the dew point measuring device (34) on the ambiently unfavourable side of the tools, i.e. on the side of the tools opposite to the flow of dry air. A true measurement of the worst air value in the tool area is therefore guaranteed.

In the illustrated embodiment example, the measuring equipment (34) for temperature and relative humidity in the area of the tools (31) (32) are arranged in the lower third portion of the tools relative to the vertical range of the tools (31)(32). The measured ambient temperature in the area of the tools is therefore not directly influenced by the rising of heat in the area of the tools (31)(32). In the case of such tools that form both halves of an injection moulding machine, it has proved to be practical if the measuring equipment (34) is arranged outside of and at a short distance from the tools and, in case of two tools that are moveable relative to eacg other, in the area of the opening aperture (37) between the tools (31)(32). In this manner the temperature pick up from the particularly condensation-endangered areas on the inner surfaces of the tools is not influenced by the rising of heat from the tools.

The temperature measuring equipment (35) on the surface of the tools can, for example, be arranged on the upper end of the tools (31)(32) because, as a rule, this is the area in which the tools are heated the most. It is practical to arrange the temperature measuring equipment (35) as close as possible to the work piece recess on the tools.

The measuring equipment for temperature and relative humidity in the ambient area of the tools (31)(32) are connected to a processor (38) in which the hx-diagram is programmed. In an hx-diagram, temperature and absolute air humidity are compared. By use of the processor and its stored hx-diagram it is possible to determine the dew point temperature in the area of the tools from the measured temperature and measured relative humidity. The corresponding values of the dew point temperature are signalled to the central control (39) from the processor. The temperature measuring equipment (35) is connected directly to this central control (39). By means of a specific electronic control, operating on known elements, which therefore do not need to be described herein, the dew point temperature and the temperature of the tool surfaces are compared thus creating a setting value for the preliminary temperature of the cooling water that ensures that the surface temperature of the tools (31)32) is always maintained minimaly above the dew point temperature of the ambient air of the tools (31)(32). This setting value is transmitted to the machine control centre (40) from where the preliminary temperature of the cooling water is regulated. By means of the measuring equipment (41) the preliminary temperature of the cooling water is continually registered where, for example, for control of the preliminary temperature of the cooling water to be controlled by mixing it with the returning cooling water a 3-way valve (42) is provided with likewise makes possible an intermixing with the returning cooling water. This 3-way valve can be controlled, for example, by a corresponding drive (43) which receives its setting values from the central control. Naturally differing methods for control of the preliminary temperature of the cooling water are possible, particularly in the cooling equipment for the water itself. The measuring equipment (41) ensures that the required preliminary temperature of the cooling water is actually accomplished. If, however, the preliminary temperature increases unintentionally, for example, if the cooling equipment for the cooling water becomes defective or the mains water supply is not of the required minimum temperature it can be achieved by specific feedback, that the rate of operation of the tool closings is altered which automatically gives longer cooling down time for the tools (31)(32).

The setting value from the central control (39) together with the control of the preliminary temperature of the cooling water (which) together optimise the tools (31)(32) cooling down time) indirectly enable optimal control of the operation time of the moulding machine to be achieved.

Within the scope of the invention the setting values from the central control or also other differing setting values obtained from the comparator values of the dew point and tool surface temperature can be extracted for use in the operation of a machine tool, therefore, for example an injection moulding machine. It is therefore conceivable that by means of such setting values the supply of dry air at a specific humidity can be controlled and that for example, the opening and closing of the tools (31)(32) can thus be influenced depending on the specific degree of cooling down of the tools, etc.

The desired value is a stabalized, but, dependent on the comparators, variable signal so that an alteration of the signal results in the corresponding control. This signal can therefore be used to control the preliminary temperature of the coolant and the rate of operation of tool usage.

For the first time, by means of the control arrangement according to the invention a possibility is given to ensure an optimal work rate on tools which are cooled by a through flow of coolant. This is particularly effective in the use of plastic moulding machines where seconds are vital in the adjustment of the working cycle. Naturally a control arrangement according to the invention can, in a similar fashion, be applied to other machine tools in which the tools are heated during operation and are cooled by means of a flow of coolant.

FIG. 10 illustrates, in schematic fashion, a cross-section through the drier (9) which shows that drier (9) consists of a cylindrical chamber in which segment-shaped sector chambers (23) are evenly distributed radially on the circumference in which each sector chamber (23) is filled with a solid desiccant. For regeneration purposes, each sector chamber contains one or more electrically-heated elements.

Regeneration is achieved by the use of a sector shutter (25) mounted on the upper side of the drier (9) and which can be rotated in arrow direction (28), which, in the position as shown in FIG. 11, allows a moist air flow only through four sector chambers (23) as two sector chambers (23) are covered by sector part (30). During the closed-off phase, the heating elements (24) in the sector chambers are heated so that this heating of the solid desiccant (27) drives the trapped moisture out and which is led out of and away from the equipment (1).

By means of the gradual drive of the sector shutter (25) in arrow direction (28) it is always ensured that the two sector chambers (28) are closed off from above by sector part (30) and are thus not affected by a flow of damp air and are therefore regenerated during this time.

The advantage of the present invention lies in the fact that air conditioning of the complete hall in which the plastic moulding machines are located is no longer necessary, only the mould halves of the machine are dehumidified. In this way up to 1000 cubic meters of moist air per hour are led through the equipment (1), thus removing up to 9 g per kg of moisture.

At a dew point of, for example, 24° the cooling water temperature for the water-cooled tool must be 21° C. to completely avoid the build-up of condensation on the tool. With equipment such as the present invention, however, a dew point temperature of 11° C. in the area of the mould can be achieved, which means that a preliminary cooling water temperature of between 8° and 9° C. can be set. This can result in a reduction in the tool work cylcle of up to 40%.

What we claim is:

1. An apparatus for applying dry air for use on one or more tools which are heated by use, are cooled by internally circulating coolant during use, and can be run at varying operating speeds, comprising:
   a transportable housing;
   a pre-drier within said housing receiving ambient air through said housing;
   an absorption-principle drier;
   a first communication means between said pre-drier and said drier;
   a fan disposed in said first communication means;
   a blower box having one or more swivelling nozzles for directing dry air onto said tools;
   a dry air duct running from said drier to said blower box;
   control means for adjusting the temperature of said coolant and rate of operation of said tools; and
   means for measuring the temperature and relative air humidity of said dry air directed onto said tools, said measuring means disposed at a point as close as possible to the surface of said tool used in production, said measuring means signaling said control means.

2. The apparatus of claim 1 wherein a filter is disposed between said housing and said pre-drier.

3. The apparatus of claim 1 wherein said chamber is a pressure-proof chamber.

4. The apparatus of claim 1 wherein said measuring means is disposed between two said tools, when two said tools are movable relative to each other.

5. The apparatus of claim 1 wherein said control means further contains a processor adapted to receive measurements of temperature and relative air humidity, compare said measurements with values from a temperature/absolute air humidity diagram, and adjust the temperature of said coolant and rate of operation of said tools.

* * * * *